US010467652B2

(12) United States Patent
McConnell et al.

(10) Patent No.: US 10,467,652 B2
(45) Date of Patent: Nov. 5, 2019

(54) SYSTEM AND METHODS FOR DETERMINING CONSUMER BRAND AWARENESS OF ONLINE ADVERTISING USING RECOGNITION

(71) Applicant: Oracle America, Inc., Redwood Shores, CA (US)

(72) Inventors: Theodore McConnell, Cincinnati, OH (US); Jonah Goodhart, Ithaca, NY (US)

(73) Assignee: Oracle America, Inc., Redwood Shores ( * ) Notice: Subject to any disclaimer, the term of this patent is extended or adjusted under 35 U.S.C. 154(b) by 0 days.

(21) Appl. No.: 13/939,131

(22) Filed: Jul. 10, 2013

(65) Prior Publication Data

US 2017/0316454 A1  Nov. 2, 2017

Related U.S. Application Data

(60) Provisional application No. 61/670,436, filed on Jul. 11, 2012.

(51) Int. Cl.
*G06Q 30/02* (2012.01)
(52) U.S. Cl.
CPC .............................. *G06Q 30/0245* (2013.01)
(58) Field of Classification Search
USPC ...... 705/14.1–14.78, 26.1–27.7, 37–70, 265; 725/3–17; 463/37–67
See application file for complete search history.

(56) References Cited

U.S. PATENT DOCUMENTS

| 6,108,637 | A  | 8/2000  | Blumenau |
| 6,115,680 | A  | 9/2000  | Cofee |
| 6,230,204 | B1 | 5/2001  | Fleming, III |
| 6,327,619 | B1 | 12/2001 | Blumenau |
| 6,418,470 | B2 | 7/2002  | Blumenau |
| 7,263,497 | B1 | 8/2007  | Wiser et al. |
| 7,310,609 | B2 | 12/2007 | Middleton, III et al. |
| 7,386,473 | B2 | 6/2008  | Blumenau |
| 7,613,635 | B2 | 11/2009 | Blumenau |
| 7,660,737 | B1 | 2/2010  | Lim et al. |
| 7,716,326 | B2 | 5/2010  | Blumenau |
| 7,756,974 | B2 | 7/2010  | Blumenau |
| 7,917,755 | B1 | 3/2011  | Giliyaru |

(Continued)

OTHER PUBLICATIONS

WELOVED, "WebDesignServed," May 19, 2010, 2 pages, http://www.webdesignserved.com.

(Continued)

*Primary Examiner* — E Carvalho
(74) *Attorney, Agent, or Firm* — Kilpatrick Townsend & Stockton, LLP

(57) ABSTRACT

The present invention is directed to system architecture of a measurement platform configured to determine advertisement awareness by consumers and methods for determining advertisement awareness by consumers at low cost. The system architecture is flexible and may be applied to any advertisement and is configured to operate without involvement or approval of the advertiser. The system uses user recognition rather than user recall as an indication of measuring awareness within a publisher's website, by tracking advertisement exposure to consumers and dynamically constructing sample interrogation sets to query consumers.

12 Claims, 12 Drawing Sheets

(56) References Cited

U.S. PATENT DOCUMENTS

| | | |
|---|---|---|
| 8,108,245 B1 | 1/2012 | Hosea |
| 8,190,604 B2 | 5/2012 | Wen et al. |
| 8,255,491 B1 | 8/2012 | Arzur |
| 8,266,115 B1 | 9/2012 | Park |
| 8,386,314 B2 | 2/2013 | Kirkby et al. |
| 8,508,532 B1 | 8/2013 | Logan |
| 8,880,996 B1 | 11/2014 | Deshpande |
| 9,282,048 B1 | 3/2016 | Fichter et al. |
| 2002/0098891 A1* | 7/2002 | Graham et al. ................ 463/42 |
| 2002/0103698 A1 | 8/2002 | Cantrell |
| 2002/0111865 A1 | 8/2002 | Middleton, III |
| 2002/0165773 A1 | 11/2002 | Natsuno et al. |
| 2003/0200145 A1 | 10/2003 | Krassner et al. |
| 2005/0210533 A1 | 9/2005 | Copeland et al. |
| 2005/0235030 A1 | 10/2005 | Lauckhart et al. |
| 2006/0026063 A1 | 2/2006 | Collins |
| 2006/0080681 A1 | 4/2006 | Anwar et al. |
| 2007/0050251 A1 | 3/2007 | Jain et al. |
| 2007/0255702 A1 | 11/2007 | Orme |
| 2007/0266305 A1 | 11/2007 | Cong et al. |
| 2008/0004958 A1 | 1/2008 | Ralph et al. |
| 2008/0114709 A1 | 5/2008 | Dixon |
| 2008/0120165 A1 | 5/2008 | Yan |
| 2009/0076899 A1 | 3/2009 | Gbodimowo |
| 2009/0157813 A1 | 6/2009 | Jung et al. |
| 2009/0216621 A1 | 8/2009 | Anderson et al. |
| 2009/0271260 A1 | 10/2009 | Sharma et al. |
| 2009/0300528 A1 | 12/2009 | Stambaugh |
| 2010/0023868 A1 | 1/2010 | Bonforte et al. |
| 2010/0057558 A1* | 3/2010 | Yano ................ G06K 9/325 705/14.45 |
| 2010/0095317 A1 | 4/2010 | Toebes et al. |
| 2010/0121676 A1 | 5/2010 | Jackson |
| 2010/0146380 A1 | 6/2010 | Rousso et al. |
| 2010/0169792 A1 | 7/2010 | Ascar et al. |
| 2010/0241597 A1 | 9/2010 | Chen et al. |
| 2010/0251128 A1 | 9/2010 | Cordasco |
| 2010/0287054 A1 | 11/2010 | Zohar et al. |
| 2010/0295774 A1 | 11/2010 | Hennessey |
| 2010/0310175 A1 | 12/2010 | Holt |
| 2011/0029393 A1 | 2/2011 | Apprendi et al. |
| 2011/0072131 A1 | 3/2011 | Zohar et al. |
| 2011/0125587 A1 | 5/2011 | Netzer et al. |
| 2011/0125594 A1* | 5/2011 | Brown ................ G06Q 30/02 705/14.73 |
| 2011/0137737 A1 | 6/2011 | Baird et al. |
| 2011/0163971 A1 | 7/2011 | Wagner et al. |
| 2011/0239243 A1* | 9/2011 | Dierks et al. ................ 725/14 |
| 2011/0320286 A1 | 12/2011 | Zohar et al. |
| 2012/0078707 A1 | 3/2012 | Ramakrishnan et al. |
| 2012/0106793 A1 | 5/2012 | Gershenson et al. |
| 2012/0317472 A1 | 12/2012 | Chernysh |
| 2012/0324098 A1 | 12/2012 | De Jager et al. |
| 2013/0031470 A1 | 1/2013 | Daly, Jr. et al. |
| 2013/0124342 A1 | 5/2013 | Virkar et al. |
| 2013/0179767 A1 | 7/2013 | Bajric et al. |
| 2013/0335576 A1 | 12/2013 | Gotschlich |
| 2014/0040786 A1 | 2/2014 | Swanson et al. |
| 2014/0181634 A1 | 6/2014 | Compain |

OTHER PUBLICATIONS

WELOVED.com WELOVEAD, dated Mar. 7, 2011, 14 pages, http://web.archive.org/web/2011 0307041600/http://www.welovead.com/en/works/database.

* cited by examiner

SYSTEM AND METHODS FOR DETERMINING CONSUMER BRAND AWARENESS OF ONLINE ADVERTISING USING RECOGNITION

CROSS REFERENCE TO RELATED APPLICATIONS

The present application claims the benefit of priority under 35 U.S.C. § 119(e) of U.S. Provisional Application No. 61/670,436 entitled "Method and System for Determining Consumer Brand Awareness of Online Advertising Using Recognition," filed on Jul. 11, 2012, by Ted McConnell and Jonah Goodhart. The entire contents of the provisional application are incorporated by reference herein.

BACKGROUND

With the increase in online advertising, advertisers require positive feedback and confirmation of the number of people who have actually viewed their advertising ("ad"). It is simply not enough to know that an advertisement has been served, or that a target or other audience may have viewed or seen it, or that it was in-view.

Today, there are several systems that are designed to assess viewing of advertising by asking viewers questions about advertisements that they have seen. These systems are designed and configured to determine the extent to which a particular advertisement made a difference. As one example, did viewers become aware of the brand being advertised? Did viewers like the brand being advertised? Will viewers now plan on buying the brand being advertised?

These systems all require that the advertiser be involved in this assessment, determination, or measurement process, and incur the costs of the measurement themselves. This requirement prevents publishers from gathering their own information independently of the advertiser. Yet, this information is critical to publishers who wish to measure the extent to which their different approaches to advertising actually impinge on consumer awareness of a particular advertiser's advertisement.

Thus, there exists a need for a measurement platform configured to measure advertisement awareness by consumers, which has reasonable pricing as compared with the other measures that currently exist, and which may be applied to any advertisement, and which may be be constructed and operated without any involvement or approval of the advertiser.

SUMMARY

The present invention and technology is directed to measurement platform or system architecture and methods for measuring advertisement awareness by consumers at low cost and in a flexible manner, which may be easily applied to any advertisement and without involvement or approval of advertisers. The measurement platform or system architecture is configured to rely on user ability to recognize an advertisement that has been previously viewed by distinguishing it from advertisements that have not been previously viewed. In one implementation, the measurement platform and system architecture utilizes user recognition abilities rather than user recall abilities as indications for measuring user awareness of a particular advertisement. The platform or system measures user awareness within a publisher's website, by tracking advertisement exposure to consumers and dynamically constructing sample interrogation sets including one or more advertisements that have actually been viewed by a particular consumer and one or more that have not been seen by the particular consumer, and querying the particular consumer to designate the advertisements that they have viewed. The measurement platform or system, upon determining that the particular consumer is correct, within statistical parameters to accommodate a lucky guess, presumes exposure to advertisements for which the queries were presented and awareness of a particular brand to which the advertising was directed.

In accordance with another aspect of the present invention, the measurement platform or system dynamically constructs queries from the advertisement creative or artwork, and uses them in the sample interrogation sets. This provides a strong indication of which placements or consumer segments noticed a particular advertisement, allowing optimization in the advertising process, based more on consumer input, rather than simply on presumed media exposure.

In accordance with the methods of the present invention, there are at least three phases in which the methods may be executed, including one or more operations for 1) capturing exposure information and advertisement content, 2) generating and querying the right consumer with pertinent questions, and 3) accumulating and communicating the results obtained from the queries.

In accordance with the one or more operations for capturing exposure information and advertisement content, the method of the present invention and technology either discovers, captures, obtains, or otherwise receives all the advertisements on a webpage with other data, for example, variables, advertisement tags, click tags, cursor interactions, etc. The platform or system formulates identification (e.g., a cookie) with a reference to each advertisement indicating that this identification has been exposed to a set of advertisements. The advertisement and viewer data may be written to an external server in real time as the webpage containing the advertisements is rendered.

In accordance with the one or more operations for generating and querying the right consumer with pertinent questions, the one or more operations may include formulating a "questionnaire" posing a question on the particular advertisements viewed in a predetermined time period. An answer that is deemed correct may provide a measure of awareness. The question itself may be served as an advertisement with dynamic content, presented after a user has exited the webpage on which the exposure occurred.

In accordance with the one or more operations for accumulating and communicating the results obtained from the queries, they may include analysis and distribution of the outputs received. As one example, an output may inform on the absolute and relative number of viewers who were able to correctly recognize advertisement that they have viewed in the past. Other outputs may include information on any data collected or otherwise received on the conditions under which advertising was viewed, which data may be summarized and presented. As one example, data for each advertisement viewed may inform on the location of the advertisement on the webpage.

In accordance with yet another implementation, the methods of the present invention and technology may place a browser-resident instruction set (e.g., a computer program) on any webpage. In some instances, this browser-resident instruction set maybe inserted by a publisher. To discern exposure information, when the webpage is rendered, the instruction set is configured to a) locate all advertisement units on the webpage; b) write the actual pixels of each advertisement unit to an external server, such that the images may be re-sized and re-presented later in the questionnaire. i.e., to "capture" the advertisements; c) cause the data to be written such that that viewer (browser/user/human) is marked or otherwise tags as having viewed those advertisements; d) discover the in-view status of each advertisement, and write an indication to the same external server to mark each advertisement that was in-view. Consumers may be interrogated by presenting a questionnaire. In some instances, an advertisement unit may be placed on any webpage by the publisher and reserved to serve as the questionnaire. The advertisement frame (or questionnaire frame) calls the same external server, which may check to determine if that consumer/viewer has previously been exposed to an advertisement on that site, in that visit, but perhaps on a different page. If so, the server places the ad the consumer viewed in a random quadrant or position within the advertisement frame, but reduced to a smaller size, such that the advertisement is large enough to facilitate recognition, yet small enough that several advertisements (exposed, and unexposed) may be easily accommodated within the questionnaire advertisement unit. In some instances, the server is also configured to place advertisements to which the consumer has not been exposed within the same frame. In some implementations, the advertisement unit may invite consumers to indicate by click or gesture which of the ads they have seen before. If a determination is made that the consumers have indicated viewing of at least one advertisement within the frame, a result is communicated back to the server. The server may then easily determine correct choices as it is aware of advertisements to which the consumers were exposed to.

In some implementations, the results are recorded, analyzed, and distributed. The answers, and an indication of correctness, are written to the same server, or to another server, and tabulated such that the conditions under which consumers/viewers were able to recognize the advertisement are enumerated, along with total computations for all conditions, and summaries by different factors, for example, page location of an advertisement, are all reported to the publisher.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
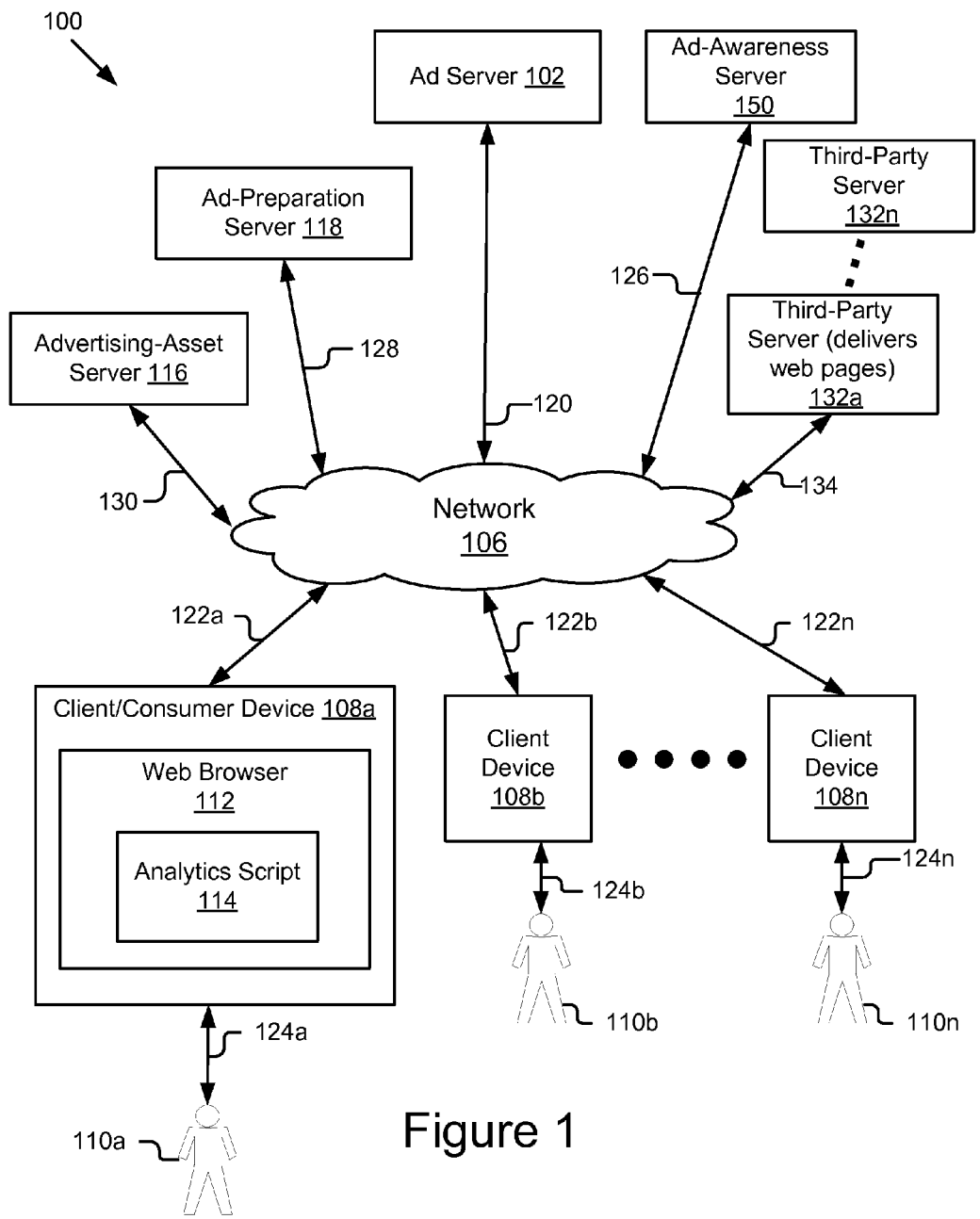
FIG. 1 is a block diagram of an example system architecture illustrating various components including an Advertisement ("Ad") Awareness Server, which are involved in implementing the operations of the present invention.

The present technology is directed to measurement platform or system architecture and methods for measuring advertisement awareness by consumers at low cost and in a flexible manner, which may be easily applied to any advertisement and without involvement or approval of advertisers. The measurement platform or system architecture is configured to assess user ability to recognize an advertisement that has been previously viewed by distinguishing it from advertisements that have not been previously viewed. In some implementations, the measurement platform and system architecture utilizes user recognition abilities rather than user recall abilities as indications for measuring user awareness of a particular advertisement. The platform or system measures user awareness within a publisher's website, by tracking advertisement exposure to consumers and dynamically constructing sample interrogation sets including one or more advertisements that have actually been viewed by a particular consumer and one or more that have not been seen by the particular consumer, and querying the particular consumer to designate the advertisements that they have viewed. The measurement platform or system, upon determining that the particular consumer is correct, within statistical parameters to accommodate a lucky guess, presumes exposure to advertisements for which the queries were presented and awareness of a particular brand to which the advertising was directed.

In some instances, the measurement platform or system dynamically constructs queries from the advertisement creative or artwork, and uses them in the sample interrogation sets. This provides a strong indication of which placements or consumer segments noticed a particular advertisement, allowing optimization in the advertising process, based more on consumer input, rather than simply on presumed media exposure.

In some instances, there are at least three phases in which the methods execute one or more operations for 1) capturing exposure information and advertisement content, 2) generating and querying the right consumer with pertinent questions, and 3) accumulating and communicating the results obtained from the queries.

In some instances the one or more operations for capturing exposure information and advertisement content either discover, capture, obtain, or otherwise receive all the advertisements on a webpage with other data, for example, variables, advertisement tags, click tags, cursor interactions, etc. The platform or system formulates identification (e.g., a cookie) with a reference to each advertisement indicating that this identification has been exposed to a set of advertisements. The advertisement and viewer data may be written to an external server in real time as the webpage containing the advertisements is rendered.

In some instances, the one or more operations for generating and querying the right consumer with pertinent questions include formulating a "questionnaire" posing a question on the particular advertisements viewed in a predetermined time period. An answer that is deemed correct may provide a measure of awareness. The question itself may be served as an advertisement with dynamic content, presented after a user has exited the webpage on which the exposure occurred.

In some instances, the one or more operations for accumulating and communicating the results obtained from the queries include analysis and distribution of the outputs received. As one example, an output may inform on the absolute and relative number of viewers who were able to correctly recognize advertisement that they have viewed in the past. Other outputs may include information on any data collected or otherwise received on the conditions under which advertising was viewed, which data may be summarized and presented. As one example, data for each advertisement viewed may inform on the location of the advertisement on the webpage.

In some implementations, the methods of the present invention and technology may place a browser-resident instruction set (e.g., a computer program) on any webpage. In some instances, this browser-resident instruction set maybe inserted by a publisher. To discern exposure information, when the webpage is rendered, the instruction set is configured to a) locate all advertisement units on the webpage; b) write the actual pixels of each advertisement unit to an external server, such that the images may be re-sized and re-presented later in the questionnaire. i.e., to "capture" the advertisements; c) cause the data to be written such that that viewer (browser/user/human) is marked or otherwise tags as having viewed those advertisements; d) discover the in-view status of each advertisement, and write an indication to the same external server to mark each advertisement that was in-view. Consumers may be interrogated by presenting a questionnaire. In some instances, an advertisement unit may be placed on any webpage by the publisher and reserved to serve as the questionnaire. The advertisement frame (or questionnaire frame) calls the same external server, which may check to determine if that consumer/viewer has previously been exposed to an advertisement on that site, in that visit, but perhaps on a different page. If so, the server places the ad the consumer viewed in a random quadrant or position within the advertisement frame, but reduced to a smaller size, such that the advertisement is large enough to facilitate recognition, yet small enough that several advertisements (exposed, and unexposed) may be easily accommodated within the questionnaire advertisement unit. In some instances, the server is also configured to place advertisements to which the consumer has not been exposed within the same frame. In some implementations, the advertisement unit may invite consumers to indicate by click or gesture which of the ads they have seen before. If a determination is made that the consumers have indicated viewing of at least one advertisement within the frame, a result is communicated back to the server. The server may then easily determine correct choices as it is aware of advertisements to which the consumers were exposed to.

In some implementations, the results may be recorded, analyzed, and distributed. The answers, and an indication of correctness, are written to the same server, or to another server, and tabulated such that the conditions under which consumers/viewers were able to recognize the advertisement are enumerated, along with total computations for all conditions, and summaries by different factors, for example, page location of an advertisement, are all reported to the publisher.

In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments or implementations below with reference to user interfaces and particular hardware. However, the present technology applies to any type of computing device that can receive data and commands, and any devices providing services.

Reference in the specification to "one embodiment or one implementation," "an embodiment or an implementation," or "some embodiments or implementations" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of method algorithms and symbolic representations of operations on data bits within a computer memory of either one or more computing devices typically used in. These algorithmic descriptions and representations are the means used by those skilled in the data processing and arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," "transmitting," or "displaying" or the like, refer to the actions and processes of a computer device or system or similar electronic computing device that manipulates and transforms data represented as physical (electronic) quantities within the computer device or system's registers and memories into other data similarly represented as physical quantities within the computer system memories or registers or other such information storage, transmission, or display devices.

The present technology also relates to system architecture for performing the operations described here. This system architecture may be specially constructed for the required purposes or methods stated here, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware embodiment, an entirely software embodiment, or an embodiment including both hardware and software components. In some embodiments, this technology is implemented in software, which includes but is not limited to firmware, resident software, microcode, etc.

Furthermore, at least portions of this technology may take the form of one or more computer program products accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device. The components used in systems and networks may use a data processing system suitable for storing and/or executing program code including at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system architecture either directly or through intervening I/O controllers.

Communication units including network adapters may also be coupled to the systems to enable them to couple to other data processing systems or storage devices, through either intervening private or public networks. Modems, cable modems, and Ethernet cards are just a few examples of the currently available types of network adapters.

Finally, the algorithms and operations presented in this application are not inherently related to any particular computer or other apparatus. Various general-purpose systems may be used or modified with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

The present technology is now described more fully with reference to the accompanying figures, in which several embodiments of the technology are shown. The present technology may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

System Overview

FIG. 1 illustrates a block diagram of an advertising environment with one implementation of measurement platform or system architecture 100 in accordance with the present invention and technology. The measurement platform or system 100 and methods for measuring advertisement awareness make it possible to determine consumer awareness of brands at very low cost. Advantageously, the measurement platform or architecture 100 may be used easily for any advertisement without involving or requiring approval from an advertiser. The example platform or system 100 as illustrated in FIG. 1 determines consumer brand awareness by relying on the ability of users to recognize an advertisement that they have previously viewed and distinguishing it from advertisements that they have not previously viewed. For the examples described in the specification below, examples of online advertisements or "ads" may include any text, picture, or video, the purpose of which is advertising communication including any flash asset, any image of Internet Advertising Board (IAB) or industry standard width and height that is clickable including any recursion into iframes from the original page.

The illustrated measurement platform or system 100 may include an advertising-asset server 116, an ad-preparation server 118, an ad server 102, an ad-advertisement server 150, a network 106, one or more third-party servers 132 (*a-n*), and one or more client devices 108*a*-108*n* that are accessed by users or clients 110*a*-110*n*. In the illustrated embodiment, these entities are communicatively coupled via the network 106. Although only three client devices 108*a-n* are illustrated, it should be recognized that any number of client devices 108*n* are available to any number of users 110*n*. Furthermore, while only one network 106 is coupled to the advertising-asset server 116, the ad-preparation server 118, the ad server 102, the ad-awareness server 150, the third party server 132, and the one or more client devices 108*a*-108*n*, in practice any number of networks 106 may be connected to these entities.

In one embodiment, the advertising-asset server 116, the ad-preparation server 118, the ad server 102, the ad-awareness server 150, and the third-party server 132 are hardware servers including a processor, memory, and network communication capabilities. Although only three third party servers 132 are shown, the system 100 may include one or more third party servers 132 (*a-n*).

The ad-awareness server 150 in collaboration with the other servers of the measurement platform or system 100 uses recognition context criteria rather than recall context criteria as indications of consumer brand awareness. The measurement platform or system 100 determines consumer brand awareness within a publisher's website by tracking which advertisements are viewed by particular users or clients to determine the exposure of advertisements to particular users, clients, or consumers. This tracking involves determining advertisement exposure and dynamically constructing an "interrogation set" or "questionnaire" including one or more advertisements that the users, clients, or consumers, have in fact viewed in addition to one or more advertisements that the same users, clients, or consumers have in fact not viewed and requesting the users, clients, or consumers to designate the ones they have seen. If they are correct in their efforts to recognize the advertisements that they have viewed, within statistical parameters to accommodate a lucky guess, it is presumed that those users, clients, or consumers were presumably exposed to the advertisements, and are therefore, likely to be aware of the brand (of a product, service, or other) to which the advertisement pertains. The client devices 108 *a* through *n* further include a web browser 112 via which users may access website for viewing of advertisements and other content and an analytics script 114, which may be configured to communicate answers to the "interrogation set" or "questionnaire." The ad-awareness server either alone or in collaboration with the other servers illustrated may be configured to dynamically construct the "questionnaire" by using the advertisement creative or artwork. This advantageously provides a strong indication of which advertisement placements or consumer segments noticed a particular advertisement, facilitating optimization of the advertising process based more on consumer input, rather than simply based on assuming media exposure.

The network 106 is a conventional type, wired or wireless, and may have any number of configurations such as a star configuration, token ring configuration or other configuration. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The client, user, or consumer device 108*a* is representative of client, user, or consumer devices 108*a*-108*n* and is a conventional type of computing device, for example, a personal computer, a hardware server, a laptop computer, a tablet computer or smart phone. The client, user, or consumer devices 108*a*-108*n* may be coupled to the network 106 by signal lines 122*a*-122*n*, respectively. In one embodiment, the client, user, or consumer device 108 is coupled to receive or view online advertisements provided or served by the ad server 102 and other content from publishing sites or third party servers (for example, any one or all of third-party servers 132*a*-132*n*). The client, user, or consumer device 108 includes a web browser 112 for presenting online content and advertisements to the user. The web browser 112 presents ads and other content, and receives input from the user 110 as represented by signal line 124. The web browser 112 and analytics script 114 are operable on the client, user, or consumer device 108. The analytics script 114 may be configured to derive information from a user-specified webpage by specifying the web name, address, URL (uniform resource locator) etc. The operations of the analytics script 114 are described in greater detail below.

The advertising-asset server 116 is a computer program running on a hardware system for storing and providing advertisements or assets to other systems that will ultimately deliver the advertisements to the clients, user, or consumers. The advertising-asset server 116 may be coupled to the network 106 by signal line 130 to receive advertisements or assets from myriad advertisers. In one embodiment, the advertising-asset server 116 stores the advertisement or asset that will be delivered to the client, user, or consumer devices 108. For example, the asset may include an advertisement copy, advertisement content, JavaScript or flash that when executed by the client, user, or consumer device 108 in the web browser 112 presents the advertisement to the user or consumer 110 as designed by and intended by the advertiser serving a particular advertisement. The advertisers interact or communicate with the advertising asset-server 116 to upload and store advertisements on the advertising-asset server 116. These advertisements are then made available for delivery to the ad-preparation server 118 or the ad server 102, which in turn process the advertisements and delivers them to the client, user, or consumer device 108.

The ad-preparation server 118 may be a computer program running on a hardware system for preparing advertisements for ultimate delivery to the client, user, or consumer devices 108. In one embodiment, the ad-preparation server 118 retrieves advertisements from the advertising-asset server 116 and modifies them (e.g., by adding a script). The modified advertisements are then delivered by the ad-preparation server 118 to the ad server 102 for combination with content and delivery to the client device 108. The ad-preparation server 118 is coupled to the network 106 by signal line 128 for communication with the advertising-asset server 116 and the ad server 102.

The ad server 102 may be a computer program running on a hardware system for placing advertisements on websites. For example, the ad server 102 may be a web server that receives advertisements from the ad preparation server 118 or the advertising asset server 116 and delivers them to website visitors. The ad server 102 is coupled to the network 106 by signal line 120 for receiving advertisements from the ad-preparation server 118 or the advertising-asset server 116 and for delivering the advertisements to third-party servers 132, sites, or domains (not shown).

The ad-awareness server 150 may be a computer program operating on a hardware system for measuring consumer brand awareness. In particular, the ad-awareness server 150 is configured to use a recognition context to discern whether users have viewed particular advertisements and if the users are able to distinguish the advertisements that they have viewed from those that they have not viewed. The ad-awareness server 150 further dynamically formulates an "interrogation set" or "questionnaire" and presents it to consumers to determine answers in order to measure the extent of consumer brand awareness. The ad-awareness server 150 may either formulate a user interface (one or more) that presents the "interrogation set" or "questionnaire" to users, clients, or consumers. The ad-awareness server 150 is described in more detail below.

Client, User, or Consumer Device 108*a*

Figure 2A:
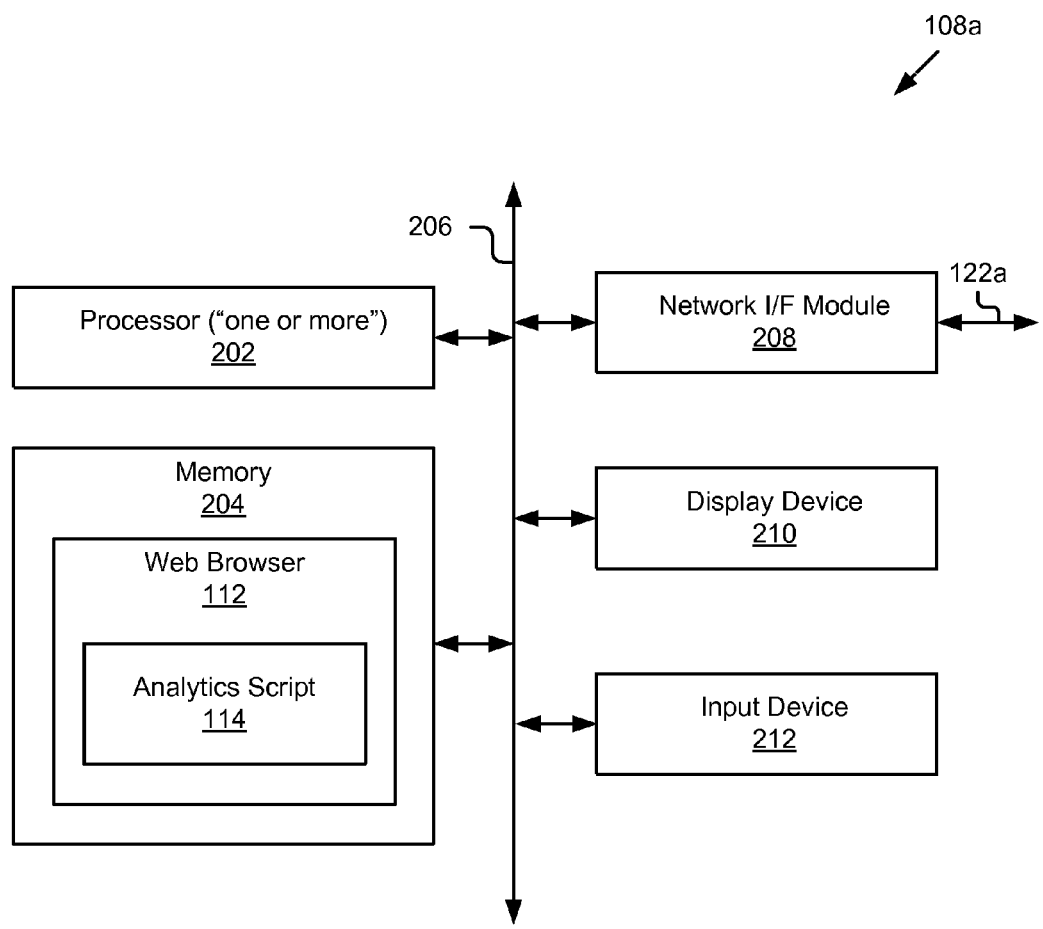
FIG. 2A is a block diagram illustrating various example hardware components of the client device.

FIG. 2A is a block diagram of one implementation of the client, user, or consumer device 108*a*. In this implementation, the client device 108*a* comprises: a processor 202 (one or more configured to operate to perform the functions of the client device 108), a memory 204 comprising a web browser 112 and an analytics script 114, a network interface (I/F) module 208, a display device 210, an input device 212, and a bus 206 along which data from and to all these components is communicated.

The processor 202 comprises an arithmetic logic unit, a microprocessor, a general-purpose controller or some other processor array to perform computations and provide electronic display signals to the display device 210. The processor 202 is coupled to the bus 206 for communication with the other components. The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included as indicated by the designation of "one or more." Other processors, operating systems, sensors, displays and physical configurations are possible.

The memory 204 stores instructions and/or data that may be executed by processor 202. The memory 204 is coupled to the bus 206 for communication with the other components. The instructions and/or data may comprise code for performing any and/or all of the techniques and functionalities described herein. The memory 204 may be a dynamic random access memory (DRAM) device, a static random access memory (SRAM) device, flash memory or some other memory device. In some embodiments or implementations, the memory 204 stores a web browser 112 and an analytics script 114. The memory 204 may comprise or be associated with storage (not separately shown) that stores data, information and instructions used by the client, user, or consumer device 108a (or any of the others through 108n). Such stored information includes information about users, publishers, advertisements, assets, and other information. The storage may be a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage may be coupled by the bus 206 for communication with other components of the client device 108a.

The network interface (I/F) module 206 may be coupled to network 106 by signal a line and coupled to the bus 206. The network interface (I/F) module 208 includes ports for wired connectivity such as but not limited to USB, SD, or CAT-5, etc. The network interface I/F module 208 links the processor 202 to the network 106 that may in turn be coupled to other processing systems. The network interface (I/F) module 208 provides other connections to the network 106 using standard network protocols such as TCP/IP, HTTP, HTTPS and SMTP. In other embodiments, the network interface (I/F) module 208 includes a transceiver for sending and receiving signals using Wi-Fi, Bluetooth® or cellular communications for wireless communication. The network interface (I/F) module 208 may provide a communication path for the components of the client device 108a to the network 106 and other systems.

In one embodiment or implementation, the display device 210 displays advertisements to the clients, users, or consumers 110a-110n for display. The input device 212 may be configured to receive input from various sources for the client, user, or consumer device 108a-108n or specifically for the display device 210, for example, one or more advertisements or "questionnaires" for viewing by the clients, user, or consumers.

Figure 2B:
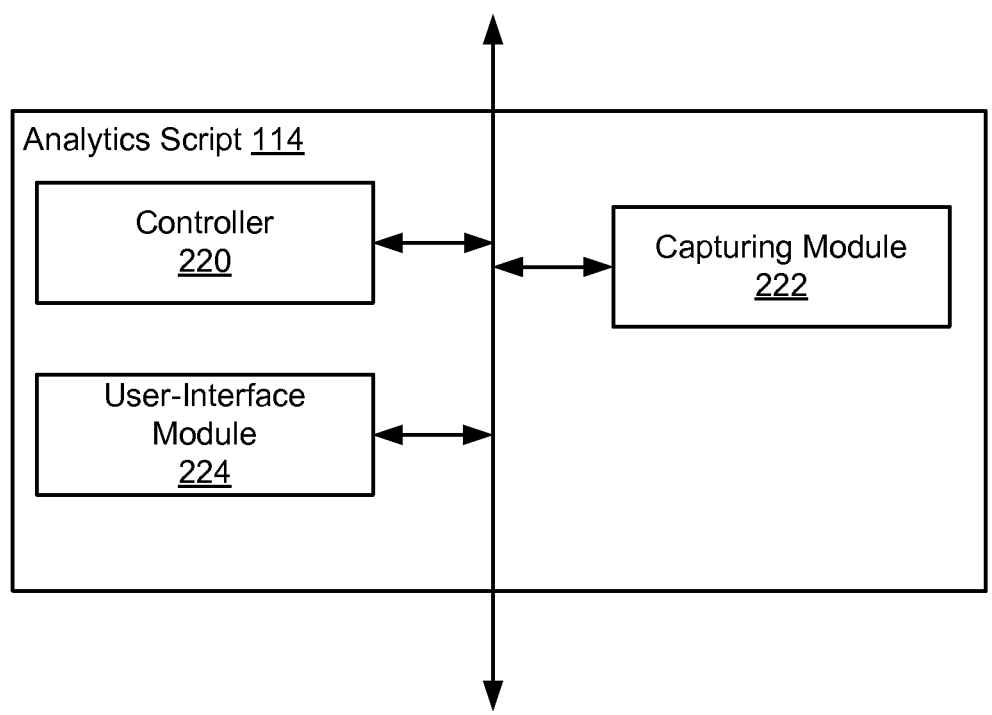
FIG. 2B is a block diagram illustrating various example software components of the Analytics Script.

FIG. 2B illustrates an example analytics script 114. The analytics script 114 is configured to capture information on advertisements viewed/interacted by viewers/consumers and send the captured information to the ad awareness server 150 for further processing and analysis. The analytics script 114 comprises a controller 220, a capturing module 222, and a user-interface module 224. The controller 220 is configured to send and/or receive data to and/or from the ad-awareness server 150. The capturing module 222 is configured to capture ads (advertisements) and its associated viewer/consumer data on a web page including, but not limitation, tracking and/or annotating ads that have been viewed, identifying viewer/consumer for each viewed ad, determining time spent on each ad by the respective viewer, tracking and/or annotating ads that have not been viewed, determining the location of ads, recording actual pixel sizes of each ad unit displayed on the web page, discovering ads that are in-view status, etc. In some embodiments, the capturing module 222 may capture the viewer data for an advertisement, via the user interface module 224. Upon capturing the information on advertisements displayed on web pages, the capturing module 222 may send, via the controller 220, the ad and viewer data real time to the ad awareness server 150 for further processing and analysis of consumer brand awareness. The user interface module 224 is configured to render an interface to a user and receive one or more inputs from the user on that interface. For example, the user interface module 224 may render an ad/questionnaire frame generated by the ad-awareness 150 to a user and receive one or more inputs on the frame from the user.

Figure 3A:
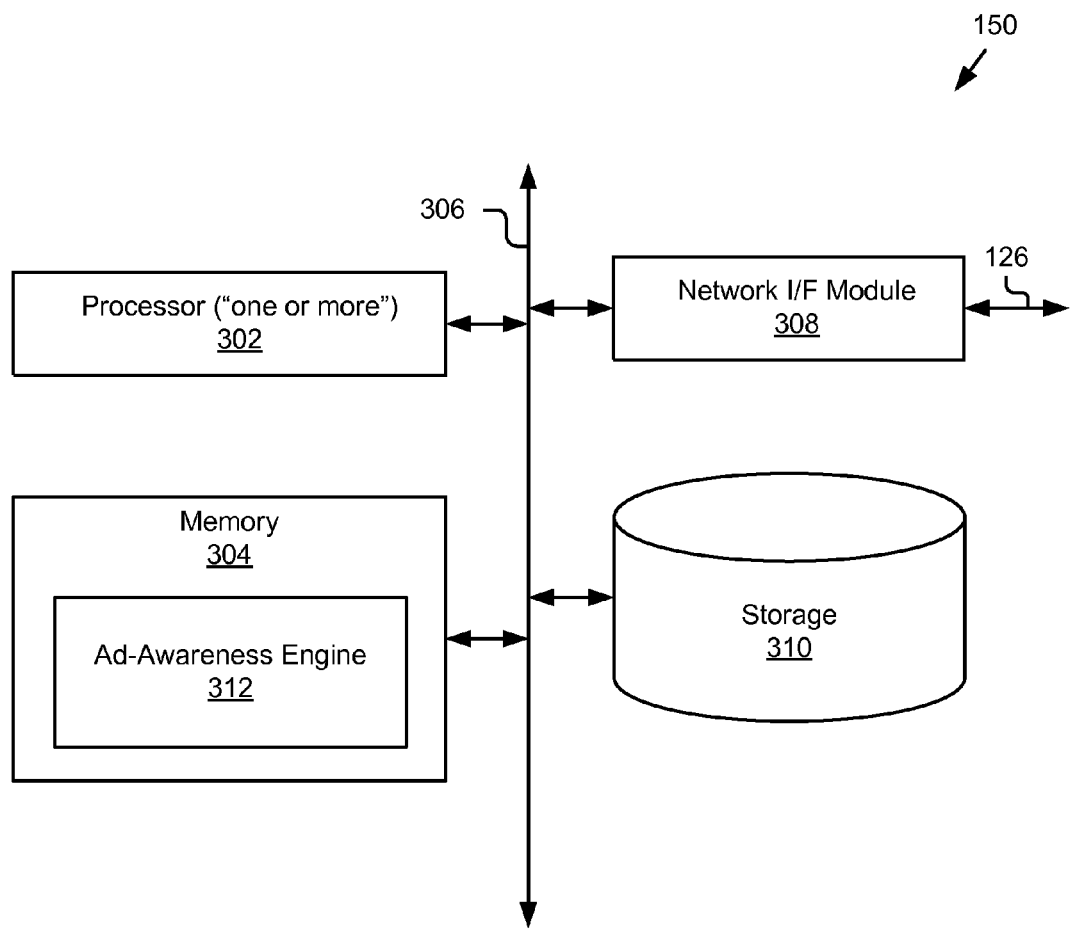
FIG. 3A is a block diagram illustrating various example hardware components of the Ad Awareness Server shown in FIG. 1.

FIG. 3A illustrates example hardware components of an example ad-awareness server 150. The ad-awareness server 150 comprises one or more processors 302, memory 304 in which resides an ad-awareness engine 312, a network interface (I/F) module 308, and storage 310. The processor 302 may comprise an arithmetic logic unit, a microprocessor, a general-purpose controller or some other processor array to perform computations and provide electronic signals to the other components. The processor 302 may be coupled to the bus 306 for communication with the other components. The processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included as indicated by the designation of "one or more." Other processors, operating systems, sensors, displays and physical configurations are possible.

The memory 304 stores instructions and/or data that may be executed by processor 302. The memory 304 may be coupled to the bus 306 for communication with the other components. The instructions and/or data may comprise code for performing any and/or all of the techniques and functionalities described herein. The memory 304 may be a dynamic random access memory (DRAM) device, a static random access memory (SRAM) device, flash memory or some other memory device. In some embodiments or implementations, the memory 304 stores the ad-awareness engine 312.

The network interface (I/F) module 308 may be coupled to network 106 by signal line 126 and coupled to the bus 306. The network interface (I/F) module 308 includes ports for wired connectivity such as but not limited to USB, SD, or CAT-5, etc. The network interface I/F module 308 links the processor 302 to the network 106 that may in turn be coupled to other processing systems. The network interface (I/F) module 308 provides other connections to the network 106 using standard network protocols such as TCP/IP, HTTP, HTTPS and SMTP. In other embodiments or implementations, the network interface (I/F) module 308 includes a transceiver for sending and receiving signals using Wi-Fi, Bluetooth® or cellular communications for wireless communication. The network interface (I/F) module 308 may provide a communication path for the components of the client, user, or consumer device 108a to the network 106 and other systems.

The storage 310 may be configured to store data, information and instructions used by the client, user, or consumer device 108a (or any of the others through 108n). Such stored information includes information about users, publishers, advertisements, assets, and other information. The storage may be a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage may be coupled by the bus 306 for communication with other components of the client device 108a.

Figure 3B:
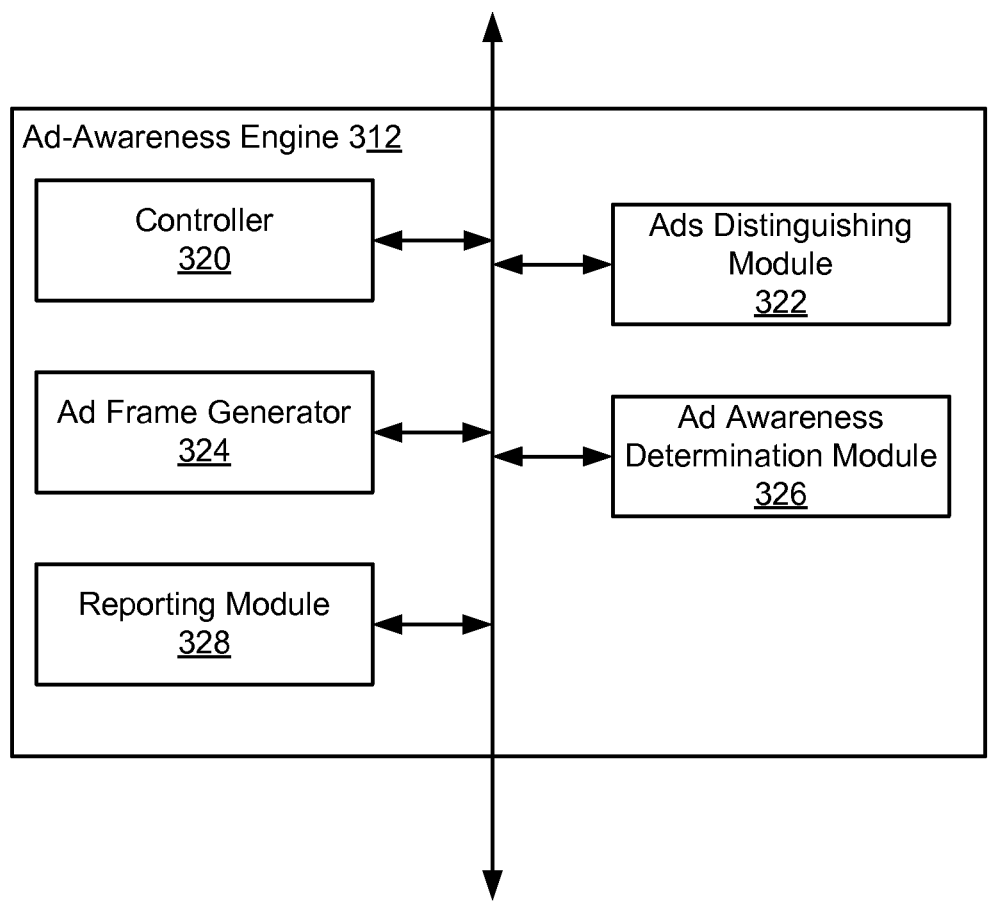
FIG. 3B is a block diagram illustrating various example software components of an Ad Awareness Engine of the Ad Awareness Server.

FIG. 3B illustrates an example ad-awareness engine 312. The example ad-awareness engine comprises a controller 320, an ads-distinguishing module 322, an ad-frame generator 324, and ad-awareness determination module 326, and a reporting module 328. In some implementations, the controller 320 may comprise one or more processors, each comprising an arithmetic logic unit, a microprocessor, a general-purpose controller or some other processor array to perform computations and provide electronic signals to the other components. The controller 320 may be coupled to the bus 306 (shown also in FIG. 3A) for communication with the other components. The controller 320 processes data signals and may comprise various computing architectures including a complex instruction set computer (CISC) architecture, a reduced instruction set computer (RISC) architecture, or an architecture implementing a combination of instruction sets. The Ads-Distinguishing Module 322 is configured to distinguish the advertisement actually viewed by consumers versus those that have not been viewed. The Ads-Distinguishing Module 322 relies upon the ability of particular users or consumers to recognize an advertisement that they have viewed previously by distinguishing it from advertisements that they have not viewed previously. The Ads-Distinguishing Module 322 uses a recognition context rather than a recall context to evaluate indications of brand awareness. The Ads-Distinguishing Module 322 is configured to make this determination within a publisher's website to determine consumer exposure to particular advertising. The Ads-Distinguishing Module 322 dynamically constructs or formulates an "interrogation set" or "questionnaire" to include one or more advertisements that consumers may have in fact seen, and one or more that they may not have seen, and querying the consumers to designate the ones that the consumers have seen. The Ads-Distinguishing Module 322 is configured to perform data capture operations, during which all advertisements on a particular webpage are obtained from a Java Script (JS) operating with root authority, in an undisruptive manner. The same JS may be configured to capture other data, for example any one of, but not limited to, one or more flash variables, one or more advertisement tags, one or more click tags, one or more cursor interactions, etc. The JavaScript may be configured to write a "cookie" or like identification with a reference to each advertisement, indicating that a particular "cookie" or like identification has been exposed to a particular set of advertisements. The advertisement and viewer data may be written to an external server (one that is not within the measurement platform or system 100) in real time as the webpage containing the advertisements is rendered.

The Ad-Frame Generator 324 may be a computer program (with one or more routines or subroutines or other instruction sets) operating on a hardware system 10 generate frames for advertisements. In some implementations, the "questionnaire" that is provided to consumers may be configured to include only a 300×250 advertisement unit into which 2 or more ½ size thumbnails of advertisements may be inserted, for example posing a single question: "Which ads have you seen today?" A correct answer to this query may provide an indication of consumer brand awareness. This question may be served as an advertisement with dynamic content (i.e., dynamic insertion of advertisements that are to be measured or assessed by considering the responses by consumers to the question that it posed.) The delivery of the question should preferably be timed after the user or consumer has exited the webpage on which exposure to particular advertisements occurred. Because the advertisement unit containing the question can itself be a target, the measurement may be configured to discriminate various factors impacting perception, for example, user segment, advertisement placement, copy strength, etc.

The Ad-Awareness Determination Module 326 may be a computer program (with one or more routines or subroutines or other instruction sets) operating on a hardware system to determine advertisement awareness. The Ad-Awareness Determination Module 326 provides output based on evaluating sufficient samples of any creative of a particular advertisement and the absolute and relative number of viewers who were able to correctly recognize the particular advertisements that they have viewed. Other examples of output may include any data collected about the conditions under which the advertisements were viewed etc. The data gathered from the various outputs may be summarized. For example, data gathered for each advertisement may indicate the location on the webpage that the advertisement was viewed or the like.

The Reporting Module 328 may be configured to convey the answers, and indications of correctness to the ad-awareness server 150, or to another server. This information may be tabulated, for example, the conditions under which consumers/viewers were able to recognize the advertisements may be enumerated, along with total computations of all conditions and summaries, classified by different factors such as web page location of the advertisement etc. These statistics once properly gathered and formatted may be reported to the publisher.

Process or Method of Operation Overview

Referring now to FIGS. 4, 5, 6A, and 6B, there are three phases of operations that may be executed, namely, to perform: 1) capture of exposure information and advertisement content, 2) generation of pertinent queries that are posed to appropriate consumers, and 3) accumulation and communication of the results.

Figure 4:
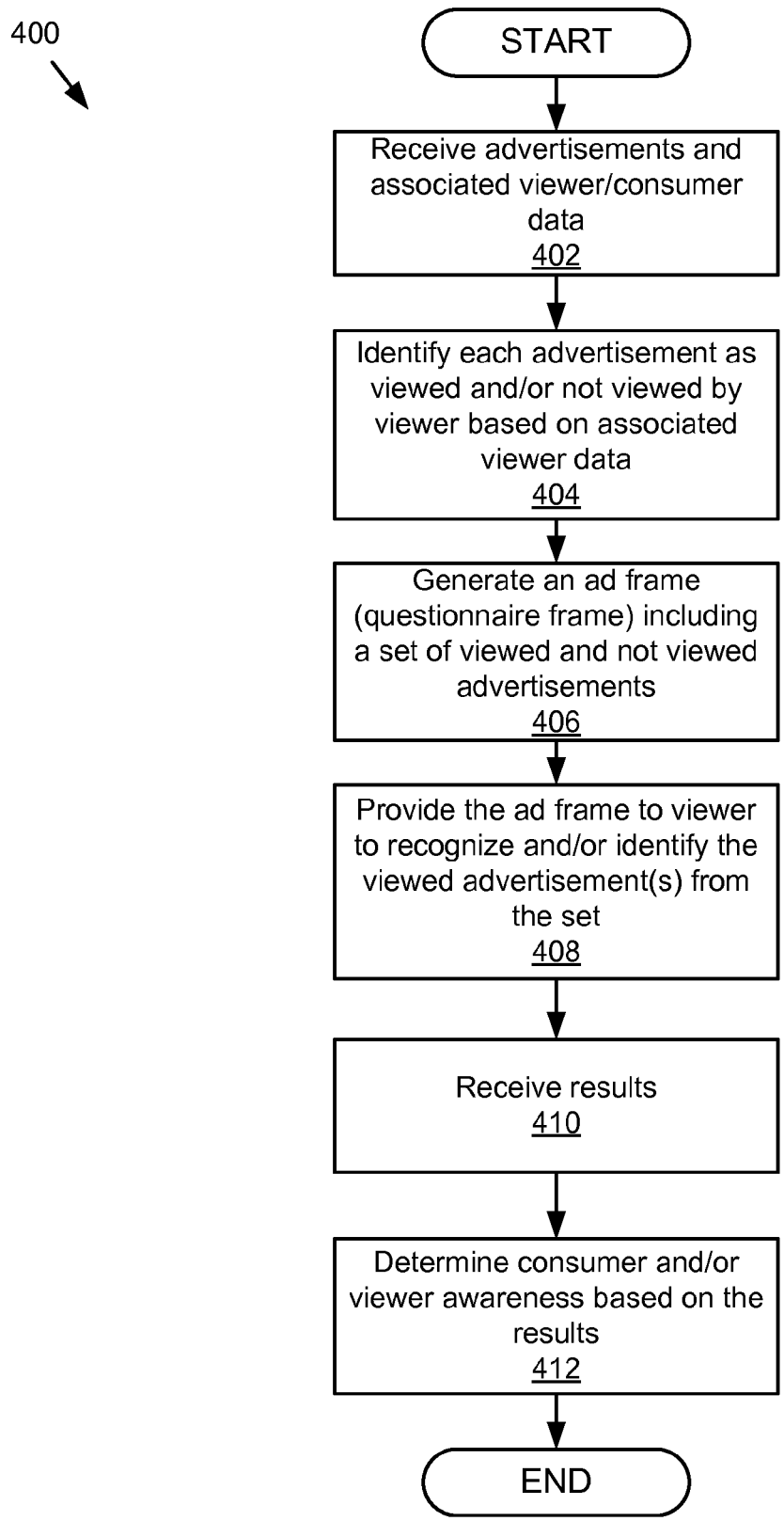
FIG. 4 is a flow chart of an example general method for measure brand awareness of consumers.

FIG. 4 illustrates a general method of operation. The method indicated generally by reference numeral 400 starts and proceeds to block 402 including one or more operations for receiving advertisements and associated viewer data. The method 400 proceeds to the next block 404 including one or more operations for identifying each advertisement as viewed and/or not viewed by particular consumers based on associated viewer data. The method 400 proceeds to the next block 406 including one or more operations for generating an advertisement ("ad") frame or "questionnaire" frame including a set of viewed advertisement with advertisements that have not been viewed. The method 400 proceeds to the next block 408 including one or more operations for providing the advertisement frame dynamically constructed to a particular consumer or viewer to permit the consumer or viewer to recognize and or identify the advertisements from the set in the questionnaire frame that have actually been viewed. The method 400 proceeds to the next block 410 including one or more operations to receive the results. The method 400 proceeds to the next block 412 including one or more operations for determining consumer and/or viewer awareness based on the results compiled. The method 400 proceeds to a block that designates an end to this particular routine or subroutine. It should be recognized that the order of the blocks illustrated are by way of example, and that the order may be different than that illustrated in this example, and that any one or more of the blocks may be omitted from the example method that is illustrated.

Figure 5:
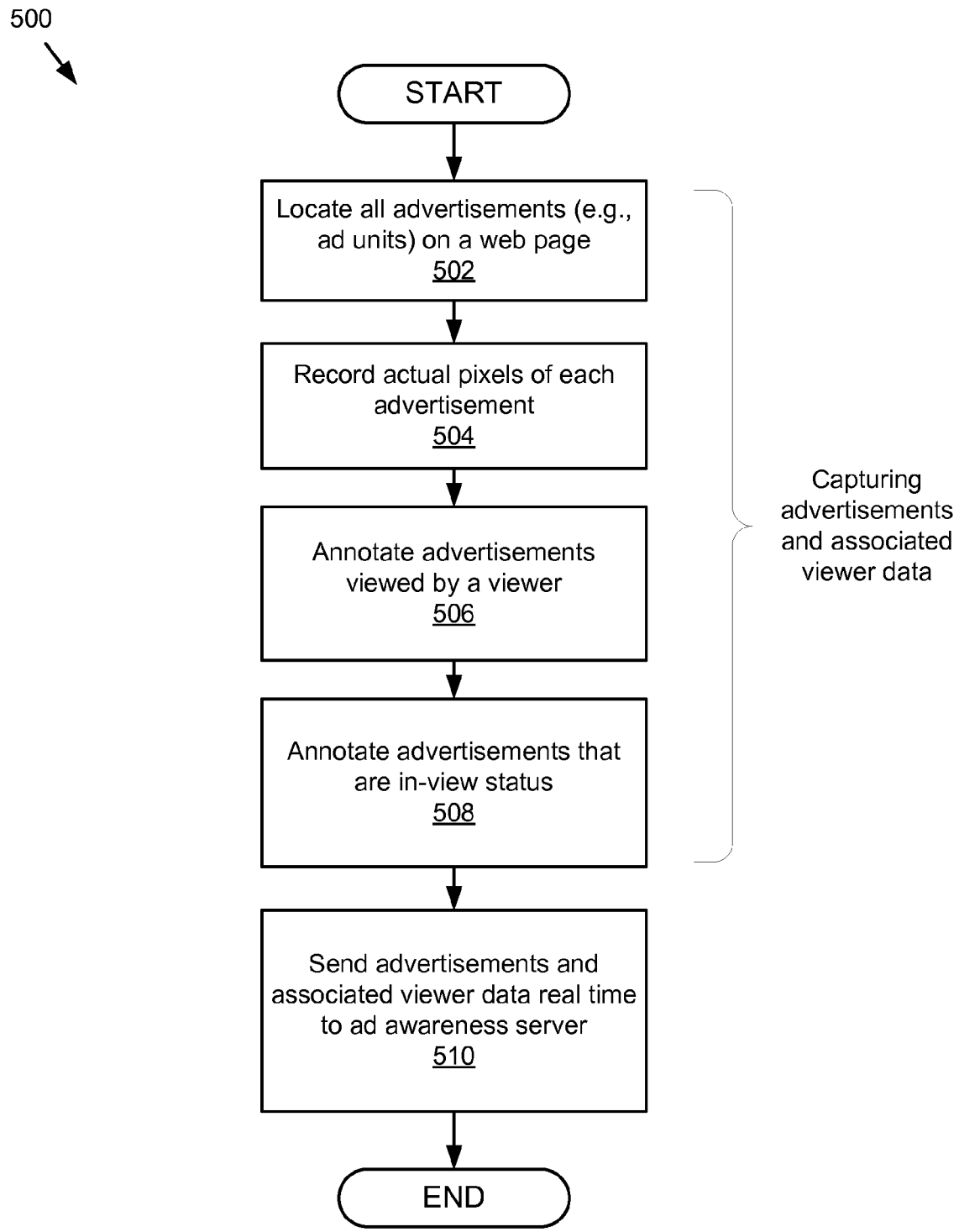
FIG. 5 is a flow chart illustrating an example method for capturing advertisements and associated viewer data on a web page.

FIG. 5 illustrates an example method for capturing advertisements and associated viewer data on webpage. The method indicated generally by reference numeral 500 begins operations and proceeds to block 502, including one or more operations for locating all advertisements (for example, advertisement units) on a particular webpage. The method 500 proceeds to the next block 504 including one or more operations for recording actual pixels of each advertisement. The method 500 proceeds to the next block 506 including one or more operations for annotating advertisements that have been viewed by a consumer or viewer. The method 500 proceeds to the next block 508 including one or more operations that send advertisements and associated viewer data in real time to the ad-awareness server 150 or any of its components designated to receive this information. The method 500 proceeds to a block that designates an end to this particular routine or subroutine. It should be recognized that the order of the blocks illustrated are by way of example, and that the order may be different than that illustrated in this example, and that any one or more of the blocks may be omitted from the example method 500 that is illustrated.

Figure 6A:
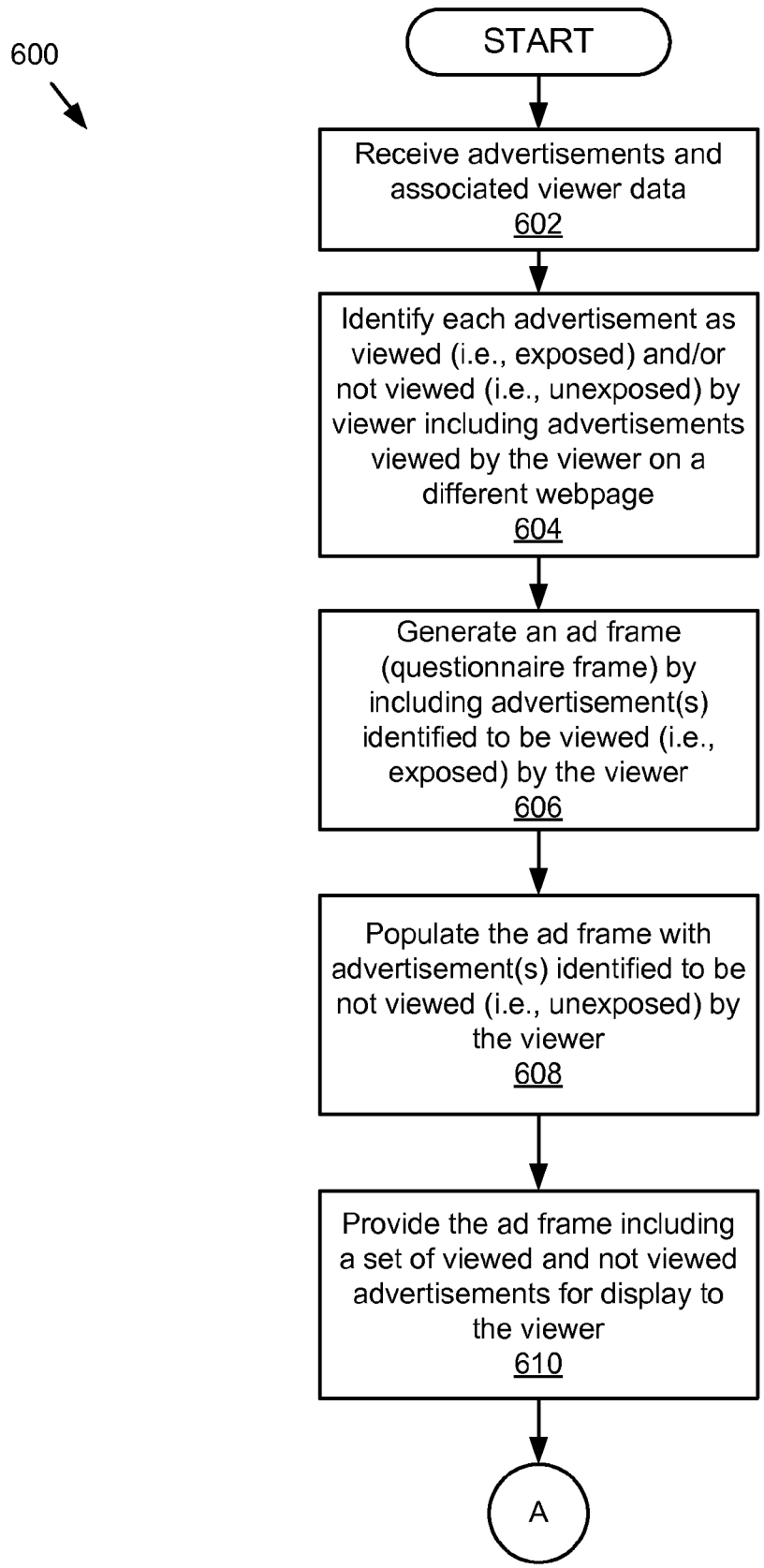
FIG. 6A is a flow chart illustrating an example method for generating and providing an advertisement or ad frame to a viewer.
Figure 6B:
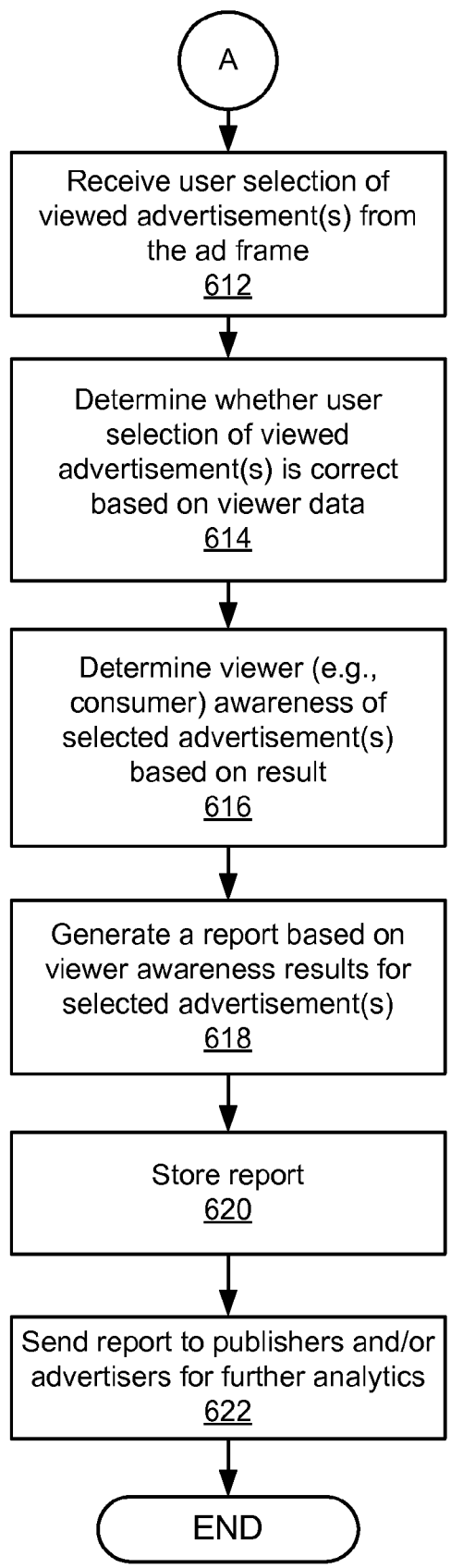
FIG. 6B is a flow chart illustrating an example method for determining and reporting viewer/consumer awareness of advertisements.

FIG. 6A illustrates an example method indicated generally by reference numeral 600 for generating and providing an advertisement frame to a consumer or viewer. The method of FIG. 6A continues on FIG. 6B, which illustrated the operations for determining and reporting viewer or consumer awareness of advertisements. The method 600 begins operations and proceeds to block 602 including one or more operations for receiving advertisements and associated viewer data. The method 600 proceeds to the next block 604 including one or more operations for identifying each advertisement as either viewed by a consumer, that is "exposed" to the consumer, and/or, not viewed by the consumer, that is "unexposed" to the consumer, including advertisements that have been viewed by the consumer on a different webpage. The method 600 proceeds to the next block 606 including one or more operations for generating an advertisement frame or "questionnaire frame" by including advertisements that have been identified as viewed by the consumer or viewer. The method 600 proceeds to the next block 608 including one or more operations for populating the advertisement frame with advertisements identified as unviewed by a consumer or those that have been unexposed to the viewer. The method 600 proceeds to the next block 610 including one or more operations for providing the advertisement frame including a set of viewed and unviewed advertisements for display to the consumer or viewer. From there, the method 600 proceeds through a connector "A" to operations illustrated in FIG. 6B. Referring now to FIG. 6B, the method 600 continues to block 612, including one or more operations for receiving user or consumer selection of "viewed" advertisement from the advertisement frame. The method 600 continues to the next block 614 including one or more operation for determining whether user-selection of the "viewed" advertisements is correct based on the viewer data. The method 600 continues to the next block 616, including one or more operations for determining viewer (for example, a consumer) awareness of the selected advertisements based on the results. The method 600 proceeds to the next block 618, including one or more operations for generating a report based on viewer or consumer awareness for the selected advertisements. The method 600 proceeds to the next block 620 including one or more operations for storing the report. The method 600 proceeds to the next block 622 including one or more operations for sending the report to publishers and/or advertisers for providing the results or for further analytics. The method 600 proceeds to a block that designates an end to this particular routine or subroutine. It should be recognized that the order of the blocks illustrated are by way of example, and that the order may be different than that illustrated in this example, and that any one or more of the blocks may be omitted from the example method 600 that is illustrated.

In operation, the Ad-Awareness Server 150 is configured to capture data that may be used to measure consumer brand awareness. In some implementations, all advertisements may be captured or recorded on a page from a Java Script ("JS") operating with root authority, in a undisruptive manner. The same "JS" may be configured to capture other data such as flash variables, ad tags, click tags, cursor interactions, etc. The JavaScript may be configured to write a "cookie" with a reference to each advertisement, indicating that the particular "cookie" has been exposed to a particular set of advertisements. The advertisement and viewer data may be written to an external server in real time as the page containing the advertisement is rendered. These operations may be followed by operations configured to pose queries to consumers. In some example implementations, the "questionnaire" may be configured to include only a 300×250 advertisement unit into which 2 or more ½ size thumbnails of advertisements may be inserted with a single query posed in one sentence. As one example, this query may simply be "Which advertisements have you seen today?" A correct answer by a particular consumer to this query yields an indication of awareness. In some instances, the query or questions itself may be served as an advertisement with dynamic content. That is, the questionnaire may be formulated with dynamic insertion of the particular advertisements for which consumer awareness is to be measured. In some instances, the deliver y of the query is preferably timed to follow any time after a particular user or consumer has actually exited the webpage on which the exposure to an advertisement occurred. Because the advertisement unit containing the question can itself be a target, the awareness measurement process can eliminate various factors impacting consumer perception, for example, user segment, advertisement placement, copy strength, etc. These operations may be followed by data analysis and distribution operations wherein the final output may be any sufficient sampling of any advertisement creative and the absolute and relative number of viewers who were able to correctly recognize advertisements they had seen. Other output may include any data collected about the conditions under which particular advertisements were viewed, and the data compiled may be summarized as desired. For example, for each advertisement, data indicating the location on the webpage that the advertisement was viewed may be presented.

In some implementations, a browser-resident computer program may be placed on any web page. In some instances, this operation may be performed by a publisher using JavaScript. For the data capture phase, upon page rendering of a particular webpage, the computer program may be configured to perform the following operations:

a. Locate all advertisements units on the webpage.
b. Write to an external server the actual pixels of each advertisement unit such that the images may be re-sized and re-presented later in the "questionnaire" as desired, that is the advertisements are "captured."
c. Cause data to be written such that that a particular viewer (browser/user/human/consumer/client) is marked as having seen or viewed those advertisements. In some instances, this is the exposure indication operation, which ties a "cookie" to one or more advertisement ID's, indicating that this particular "cookie" was exposed to these advertisements.

d. Discover the "in-view" status of each advertisement, and write an indication to the same or external server to mark each advertisement that was "in-view" as having been "in-view."

For the phase for generation of pertinent queries that are posed to appropriate consumers ("Interrogation/Questionnaire Formulation and Presentation Phase"), the following operations may be performed:

e. An advertisement unit on any page is placed by the publisher, and reserved to serve as at least a part of the questionnaire.

f. The ad frame (or questionnaire frame) calls the same or external server.

g. A personal computer or server checks to see if that consumer/viewer has previously been exposed to an advertisement on that particular website, in that visit, but on a different page.

h. If so, the server places the advertisement viewed by a consumer in a random quadrant or position within the ad frame, but reduced to a smaller size, such that the advertisement is large enough to be recognized, but small enough that several advertisements (exposed, and unexposed) may be placed inside the questionnaire advertisement unit.

i. The server may also place advertisements to which the consumer has not been exposed into the same advertisement frame.

j. The advertisement unit poses a question inviting the consumer to indicate by click or gesture which of the advertisements they have seen.

k. If the consumer indicates at least one advertisement within the frame, the result is communicated back to the server.

l. The server may then determine if the consumer has made the correct choice because it knows which advertisement the particular consumer was previously exposed to.

m. The results are recorded.

For the accumulation and communication of the results phase of operations, also known as the data analysis and distribution phase, the following operations may be performed:

n. The answers to the "questionnaire," and an indication of correctness, are communicated or written to the same server, or to another server, and tabulated such that the conditions under which consumers/viewers were able to recognize particular advertisements are enumerated, along with total computations for all conditions, and summaries by different factors, for example, page location of the advertisements, etc. This information and statistics are reported to the publisher or other entity that desires this information.

Example User Interface Displays and Data Stored

Figure 7:
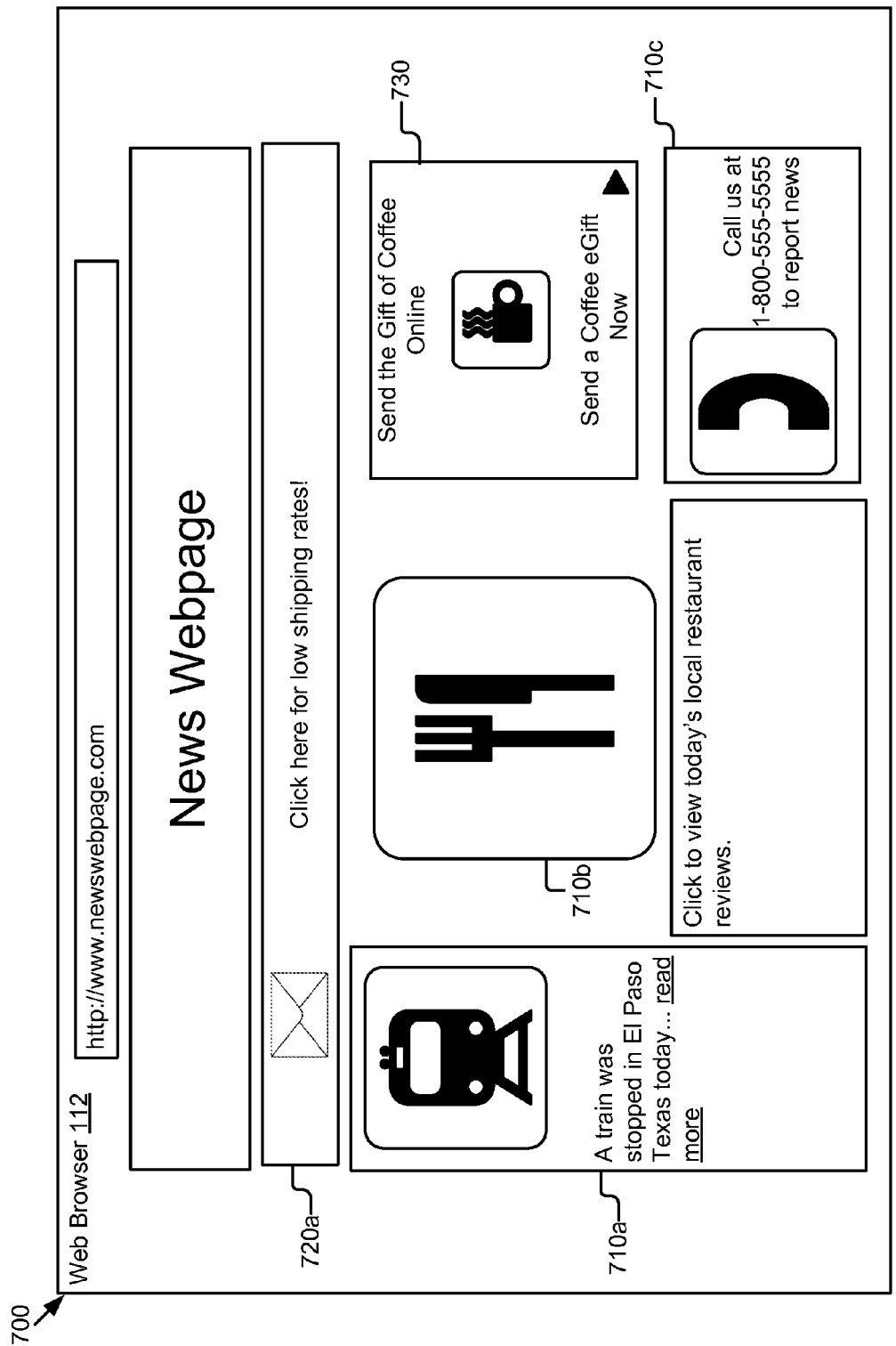
FIG. 7 is a graphical representation of an example user interface.

Referring now to FIG. 7, an example user interface display 700 to a particular consumer is illustrated. The user interface display 700 illustrates a web browser 112 and a plurality of advertisements illustrated at 720a ("Click here for low shipping rates"), 710a ("A train was stopped in El Paso Tex. today"), 710b (an advertisement for a particular restaurant), 730 ("Send the Gift of Coffee Online" and "Send a Coffee eGift Now"), and 710c ("Call us at 1-800-555-5555").

Figure 8:
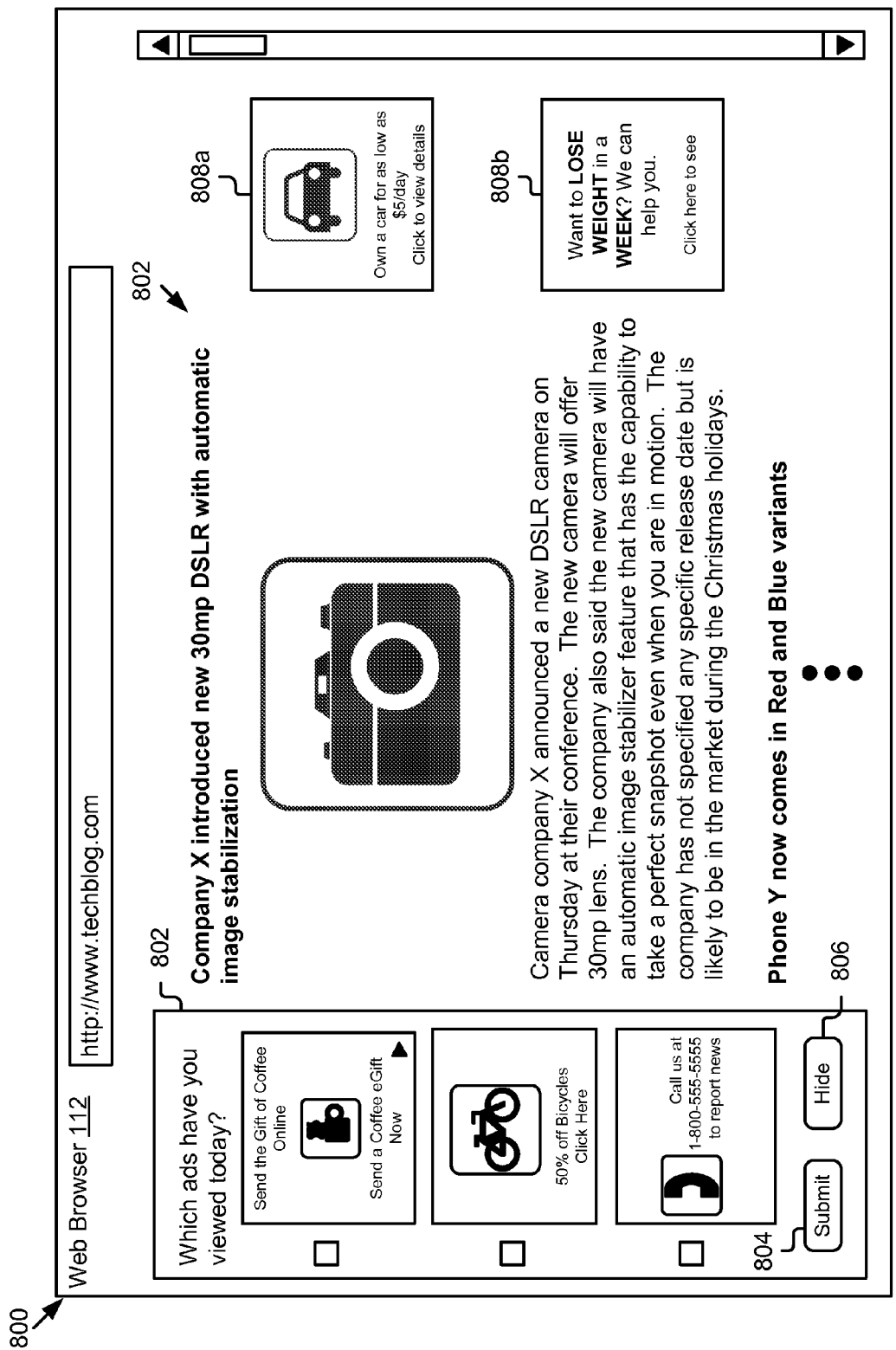
FIG. 8 is a graphical representation of an example user interface.

Referring now to FIG. 8, another example of a user interface display is illustrated at 800. The user interface display 800 illustrates a web browser 112, the web browser 112 displaying an example webpage/technology blog namely "http://www.techblog.com" as depicted in the figure. The blog includes a set of technology related posts 802 including a post "company X introduced new 30 mp DSLR with automatic image stabilization", a post "Phone Y now comes in Red and Blue variants", etc. In some embodiments, a user while viewing a webpage may be presented with an advertisement/questionnaire frame. For example, as illustrated in FIG. 8, an advertisement/questionnaire frame 804 "Which ads have you viewed today?" is presented to a user with three example advertisements for him/her to recognize. The user may then either submit 806 the completed ad frame 804 or hide 808 the frame for later access. The web page or blog illustrated in the web browser 112 also includes two example advertisements 810a (own a car as low as $5/day) and 810b (want to lose weight in a week).

Figure 9:
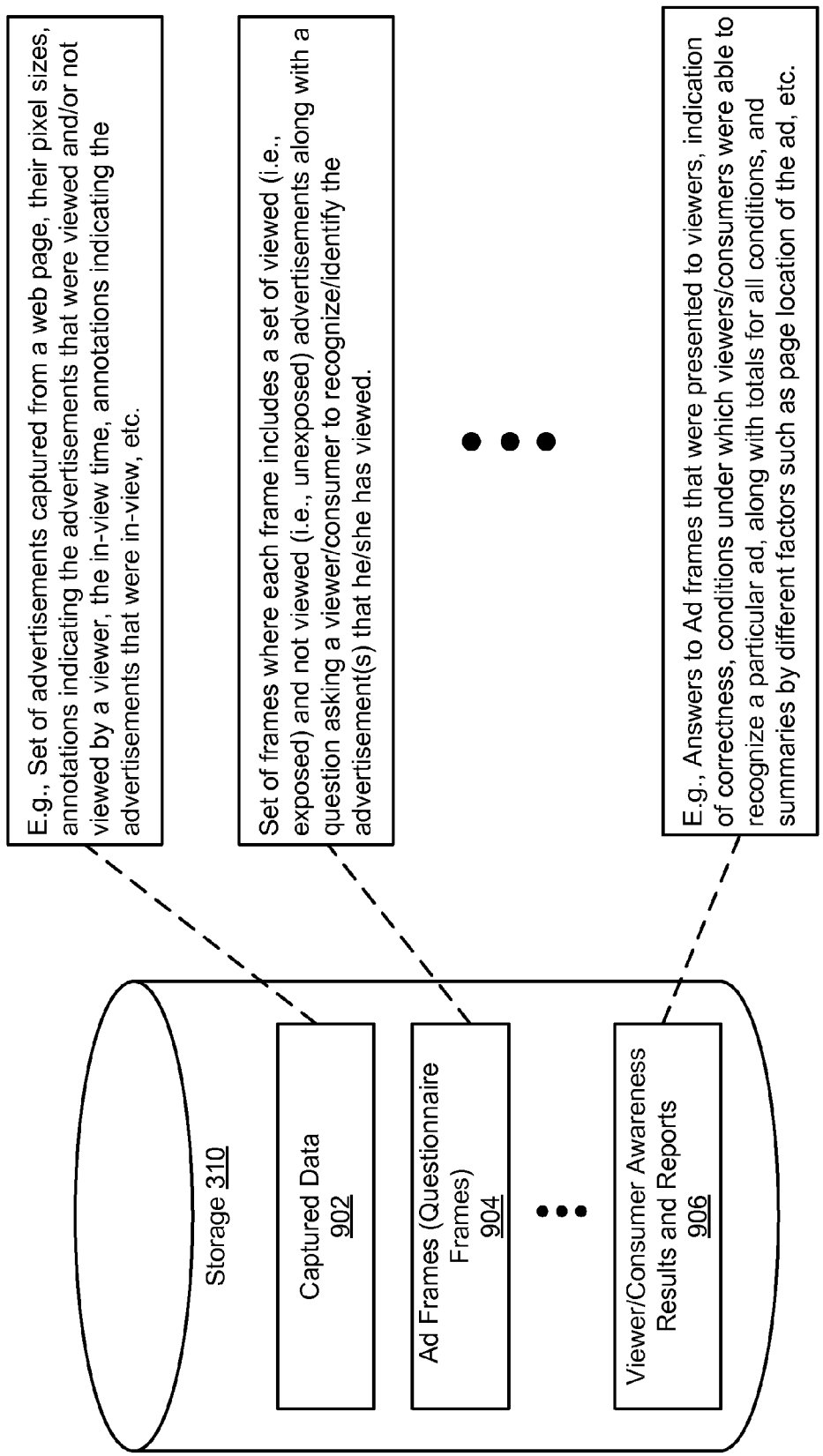
FIG. 9 is a graphical representation of a data storage configuration illustrating various examples of the types of data and entities that are being stored.

FIG. 9 illustrates data storage illustrating various entities and/or data being stored. The data storage 310 illustrates various examples, including "Captured Data," "Ad Frames (Questionnaire Frames)," and "Viewer/Consumer Awareness Results and Reports." Examples of "Captured Data" that are illustrated include "set of advertisements captured from a webpage, their pixel sizes, annotations indicating the advertisements that were viewed and/or not viewed by a viewer, the in-view time, annotations indicating the advertisements that were in-view, etc." Examples of "Ad Frames" or "Questionnaire Frames" may include the "set of frames where each frame includes a set of viewed (i.e., exposed) and not viewed (i.e., unexposed) advertisements along with a question asking a viewer/consumer to recognize/identify the advertisement(s) that he/she has viewed." The illustrated examples for Viewer/Consumer awareness results and reports include "Answers to the Ad frames that were presented to viewers, indication of correctness, conditions under which viewers/consumers were able to recognize a particular ad, along with totals for all conditions, and summaries by different factors such as page location of the ad, etc."

It should be recognized that the foregoing description of the various embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the blocks, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the blocks, routines, features, attributes, methodologies and other aspects of the present technology can be implemented as software, hardware, firmware, or any combination of the three. Also, wherever a component, an example of which is illustrated by a block, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method for measuring consumer brand awareness of advertising within a publisher's website, by an advertising-awareness server including a processor, coupled by a network to user devices that display the advertising within the publisher's website, for viewing by consumers on their user devices, the method comprising:

receiving a request to access the publisher's website, the request being received from a browser operating on a user device, the publisher's website including at least one ad slot available to display at least one ad, and the at least one ad being stored at a third-party ad server associated with an advertiser;

in response to receiving the request, loading the publisher's website on the browser operating on the user device, the loading of the publisher's website including retrieving the at least one ad from the third-party ad server associated with the advertiser and displaying the retrieved ad at the at least one ad slot of the publisher's website;

executing browser-resident instructions stored on the browser that enable the publisher to capture, by the processor in the advertising-awareness server, exposure information of the at least one ad displayed within the at least one ad slot of the publisher's website, the exposure information being received by the advertising-awareness server in real-time as the publisher's website is being rendered by the browser, and the executing browser-resident instructions by the processor:

a) locating a plurality of ads on the publisher's website,
b) writing to an external server, content data representing each ad of the plurality of ads, to re-size an original image of the ad for re-presentation in an interrogation set,
c) identifying whether or not each ad of the plurality of ads was displayed in-view within the browser, and
d) storing an in-view status of each ad of the plurality of ads, the in-view status being determined based at least in part on the identification of whether or not the ad was displayed in-view within the browser, and marking by at least one of the advertising-awareness server and the external server each ad of the plurality of ads indicating its corresponding in-view status;
e) constructing dynamically an advertisement frame with the interrogation set, the interrogation set including a set of images, each image of the set of images corresponding to an ad of the plurality of ads, by further:
f) retrieving the content data representing a particular ad of the plurality of ads to serve as at least a part of the interrogation set;
g) placing a call to at least one of the advertising-awareness server and the external server;
h) in response to placing the call, retrieving the in-view status of the particular ad and determining, based at least in part on the in-view status of the particular ad, that a consumer operating the browser has been previously exposed to the particular ad on a particular website of the publisher's in an active visit, but on a different page;
i) if the determination is affirmative, generating a reduced size image of the particular ad using the content data by re-sizing the original image of the particular ad, and placing the reduced size image of the particular ad in a random position within the advertisement frame as an image of the set of images of the interrogation set;
j) retrieving the content data representing an additional ad of the plurality of ads, the in-view status of the additional ad indicating that the additional ad was not displayed in-view within the browser, and
k) placing the additional ad as one or more additional images in the set of images of the interrogation set;
l) identifying and distinguishing within the advertisement frame select advertising viewed by particular consumers in comparison to select advertising not viewed by the particular consumers;
m) generating consumer brand awareness data, by the advertising-awareness server, with respect to the advertising, based upon determining recognition of the select advertising by the consumers who have actually viewed the select advertising by receiving consumer input to identify and distinguish the advertising that the consumers have actually viewed, by further:
n) requesting, via the advertisement frame, at least one of a click and gesture, indicating whether or not the consumer recognizes any image included in the set of images of the interrogation set;
o) receiving a particular indication corresponding to the particular ad or the additional ad; and
p) determining by the server, a correct indication by comparison of the particular indication against stored data; and
q) accumulating, by the advertising-awareness server, results of at least the consumer brand awareness data with respect to the advertising, by recording the result.

2. The method of claim 1, wherein the content data associated with each ad of the plurality of ads includes at least one of text, picture, and video data.

3. The method of claim 1, wherein a plurality of queries are formulated in a questionnaire to serve as the interrogation set and placing the interrogation set in an advertisement frame wherein the advertisements viewed by the consumers and not viewed by the consumers are dynamically inserted into the advertisement frame.

4. The method of claim 1, wherein the recognition of the advertising by the consumers who have actually viewed the advertising is based on identifying the correct indication by the consumer, which is compared against previously stored data including page location of an advertisement.

5. A computer program product comprising a non-transitory computer useable medium including a computer readable program for measuring consumer brand awareness of advertising within a publisher's website, by an advertising-awareness server, coupled by a network to user devices that display advertising within the publisher's website, for viewing by consumers on their user devices, wherein the computer readable program when executed on a computer causes the computer to:

receive a request to access the publisher's website, the request being received from a browser operating on a user device, the publisher's website including at least one ad slot available to display at least one ad, and the at least one ad being stored at a third-party ad server associated with an advertiser;

response to receiving the request, load the publisher's website on the browser operating on the user device, the loading of the publisher's website including retrieving the at least one ad from the third-party ad server associated with the advertiser and displaying the retrieved ad at the at least one ad slot of the publisher's website;

execute browser-resident instructions stored on the browser that enable the publisher to capture, by a processor in the advertising-awareness server, exposure information of the at least one ad displayed within the at least one ad slot of the publisher's website, the exposure information being received by the advertising-awareness server in real-time as the publisher's website is being rendered by the browser, the execution of the browser-resident instructions causing the processor to:

a) locate a plurality of ads on the publisher's website, b) write, to an external server content data representing each ad of the plurality of ads, to re-size an original image of the ad for re-presentation in a questionnaire, c) identify whether or not each ad of the plurality of ads was displayed in-view within the browser, and d) store an in-view status of each ad of the plurality of ads, the in-view status being determined based at least in part on the identification of whether or not the ad was displayed in-view within the browser, and mark by at least one of the advertising-awareness server and the external server each ad of the plurality of ads indicating its corresponding in-view status;

e) construct dynamically an advertisement frame with an interrogation set of queries relating to the advertising for posing to consumers, each query of the set of queries corresponding to an ad of the plurality of ads, wherein the advertisement frame is for transmission to consumers on their user devices to select advertising that has been viewed by particular consumers compared to select advertising that has not actually been viewed by the particular consumers, wherein the interrogation set in the advertisement frame distinguishes advertising that has actually been viewed by the consumers from advertising that has not been viewed by the consumers, by further:

f) retrieving the content data representing a particular ad of the plurality of to serve at least a part of the interrogation set;

g) placing a call to at least one of the advertising-awareness server and the external server;

h) in response to placing the call, retrieving the in-view status of the particular ad and determining, based at least in part on the in-view status of the particular ad that a consumer operating the browser has been previously exposed to the particular ad on a particular website of the publisher's in an active visit, but on a different page;

i) if the determination is affirmative, generating a reduced size image of the particular ad using the content data by re-sizing the original image of the particular ad, of and placing the reduced size image of the particular ad in a random position within the advertisement frame as a query of the set of queries of the interrogation set;

j) retrieving the content data representing an additional ad of the plurality of ads, the in-view status of the additional ad indicating that the additional ad was not displayed in-view within the browser; and k) placing the additional ad as one or more additional images in the set of queries of the interrogation set;

l) generate consumer brand awareness data, by the advertising-awareness server, with respect to the advertising based upon determining recognition of the select advertising by the consumers who have actually viewed the advertising by receiving consumer input to designate the select advertising that the consumers have actually viewed, by further:

m) requesting, via the advertisement frame, at least one of a click and gesture, indicating whether or not the consumer recognizes any image included in the set of images of the interrogation set;

n) receiving a particular indication corresponding to the particular ad or the additional ad; and o) determining by the server a correct indication by comparison against stored data; and p) accumulate, by the advertising-awareness server, results of at least the consumer brand awareness data with respect to the advertising by recording the result.

6. The computer program product according to claim 5, wherein the content data associated with each ad of the plurality of ads includes at least one of text, picture, and video data.

7. The computer program product according to claim 5, wherein a plurality of queries are formulated in a questionnaire to serve as the interrogation set and placing the interrogation set in an advertisement frame wherein the advertisements viewed by the consumers and not viewed by the consumers are dynamically inserted into the advertisement frame.

8. The computer program product according to claim 5, wherein the recognition of the advertising by the consumers who have actually viewed the advertising is based on identifying the correct indication by the consumer, which is compared against previously stored data including page location of an advertisement.

9. A system for measuring consumer brand awareness of advertising within a publisher's website, by an advertising-awareness server, coupled by a network to user devices that display advertising within the publisher's website, for viewing by consumers on their users devices, the system comprising:

a processor, and;

a memory storing instructions that, when executed, cause the system to:

receive a request to access the publisher's website, the request being received from a browser operating on a user device, the publisher's website including at least one ad slot available to display at least one ad, and the at least one ad being stored at a third-party ad server associated with an advertiser;

in response to receiving the request, load the publisher's website on the browser operating on the user device, the loading of the publisher's website including retrieving the at least one ad from the third-party ad server associated with the advertiser and displaying the retrieved ad at the at least one ad slot of the publisher's website;

execute browser-resident instructions stored on the browser that enable the publisher to capture, by the advertising-awareness server, exposure information of the at least one ad displayed within the at least one ad slot of the publisher's website, the exposure information being received by the advertising-awareness server in real-time as the publisher's website is being rendered by the browser, the execution of the browser-resident instructions causing the processor to:

a) locate a plurality of ads on the publisher's website,
b) write, to an external server, content data representing each ad of the plurality of ads to re-size an original image of the ad for re-presentation in a questionnaire,
c) identify whether or not each ad of the plurality of ads was displayed in-view within the browser, and
d) store an in-view status of each ad of the plurality of ads, the in-view status being determined based at least in part on the identification of whether or not the ad was displayed in-view within the browser, and mark by at least one of the advertising-awareness server and the external server each ad of the plurality of ads indicating its corresponding in-view status;
e) construct dynamically an advertisement frame with an interrogation set of queries relating to the advertising for posing to consumers, each query of the set of queries corresponding to an ad of the plurality of ads, wherein the advertisement frame is for transmission to consumers on their user devices to select advertising that has been viewed by particular consumers compared to select advertising that has not actually been viewed by the particular consumers, wherein the interrogation set in the advertisement frame distinguishes advertising that has actually been viewed by the consumers from advertising that has not been viewed by the consumers, by further:
f) retrieving the content data representing a particular ad of the plurality of to serve at least a part of the interrogation set;
g) placing a call to at least one of the advertising-awareness server and the external server;
h) in response to placing the call, retrieving the in-view status of the particular ad and determining, based at least in part on the in-view status of the particular ad that a consumer operating the browser has been previously exposed to the particular ad on a particular website of the publisher's in an active visit, but on a different page;
i) if the determination is affirmative, generating a reduced size image of the particular ad using the content data by re-sizing the original image of the particular ad, of and placing the reduced size image of the particular ad in a random position within the advertisement frame as a query of the set of queries of the interrogation set;
j) retrieving the content data representing an additional ad of the plurality of ads, the in-view status of the additional ad indicating that the additional ad was not displayed in-view within the browser; and
k) placing the additional ad as one or more additional images in the set of queries of the interrogation set;
l) generate consumer brand awareness data, by the advertising-awareness server, with respect to the advertising based upon determining recognition of the select advertising by the consumers who have actually viewed the advertising by receiving consumer input to designate the select advertising that the consumers have actually viewed, by further:
m) requesting, via using the advertisement frame, at least one of a click and gesture, indicating whether or not the consumer recognizes any image included in the set of images of the interrogation set;
n) receiving a particular indication corresponding to the particular ad or the additional ad; and
o) determining by the server a correct indication by comparison against stored data; and
p) accumulate, by the advertising-awareness server, results of at least the consumer brand awareness data with respect to the advertising by recording the result.

10. The system according to claim 9, wherein the content data associated with each ad of the plurality of ads includes at least one of text, picture, and video data.

11. The system according to claim 9, wherein a plurality of queries are formulated in a questionnaire to serve as the interrogation set and placing the interrogation set in an advertisement frame wherein the advertisements viewed by the consumers and not viewed by the consumers are dynamically inserted into the advertisement frame.

12. The system according to claim 9, wherein the recognition of the advertising by the consumers who have actually viewed the advertising is based on identifying the correct indication by the consumer, which is compared against previously stored data including page location of an advertisement.

* * * * *

UNITED STATES PATENT AND TRADEMARK OFFICE
CERTIFICATE OF CORRECTION

Page 1 of 1

PATENT NO. : 10,467,652 B2
APPLICATION NO. : 13/939131
DATED : November 5, 2019
INVENTOR(S) : Theodore McConnell and Jonah Goodhart It is certified that error appears in the above-identified patent and that said Letters Patent is hereby corrected as shown below:

On the Title Page

At (73) Assignee:
After "Shores" insert -- ,CA (US) --

In the Specification

At Column 1, Line 46, "which may be be" should be changed to -- which may be --
At Column 13, Line 60, delete "10" and insert -- to --
At Column 14, Line 59, delete "and or" and insert -- and/or --

In the Claims

Claim #5:
At Column 21, Line 1, before "response" insert -- in --
At Column 21, Line 19, "an external server" should be changed to -- an external server, --
At Column 21, Line 45, after "of" insert -- ads --
At Column 21, Line 58, after "ad" delete "of"

Claim #9:
At Column 23, Line 29, after "of" insert -- ads --
At Column 23, Line 35, "the particular ad" should be changed to -- the particular ad, --
At Column 23, Line 43, after "ad" delete "of"
At Column 24, Line 7, after "via" delete "using"

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*